(12) United States Patent
Hytten et al.

(10) Patent No.: US 9,627,862 B2
(45) Date of Patent: Apr. 18, 2017

(54) METHODS AND SYSTEMS FOR SUBSEA DIRECT CURRENT POWER DISTRIBUTION

(71) Applicant: General Electric Company, Schenectady, NY (US)

(72) Inventors: Nicolai Hytten, Oslo (NO); Piniwan Thiwanka Bandara Wijekoon, Bavaria (DE); Jean-Louis Pouliquen, Le Perray en Yvelines (FR); Henri Baerd, Champagne sur Seine (FR); Christof Martin Sihler, Bavaria (DE)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 14/140,672

(22) Filed: Dec. 26, 2013

(65) Prior Publication Data

US 2015/0188315 A1 Jul. 2, 2015

(51) Int. Cl.
*H02J 1/10* (2006.01)
*H02B 1/24* (2006.01)
(Continued)

(52) U.S. Cl.
CPC .............. *H02B 1/24* (2013.01); *E21B 41/08* (2013.01); *E21B 43/017* (2013.01); *H02B 7/00* (2013.01);
(Continued)

(58) Field of Classification Search
CPC .. H02B 1/24; H02B 7/00; E21B 41/08; E21B 43/017; H02J 1/08; H02J 1/102; H02J 3/36; H02J 4/00
See application file for complete search history.

(56) References Cited

U.S. PATENT DOCUMENTS 7,532,490 B2  5/2009  Datta et al.
7,679,941 B2  3/2010  Raju et al.
(Continued)

FOREIGN PATENT DOCUMENTS

WO  2012038100 A1  3/2012
WO  2013034378 A1  3/2013
WO  2013116586 A2  8/2013

OTHER PUBLICATIONS

Khan et al., "Multiple Load-Source Integration in a Multilevel Modular Capacitor Clamped DC-DC Converter Featuring Fault Tolerant Capability", Applied Power Electronics Conference, Apec 2007—Twenty Second Annual IEEE, pp. 361-367, Mar. 2007.
(Continued)

*Primary Examiner* — Daniel Cavallari
(74) *Attorney, Agent, or Firm* — Armstrong Teasdale LLP

(57) ABSTRACT

A submersible power system includes at least one DC power source and at least one submersible power distribution system electrically coupled to the at least one DC power source. The at least one submersible power distribution system includes at least one receptacle configured to be exposed to an underwater environment. The at least one submersible power distribution system also includes a plurality of power conversion modules removably positioned within the at least one receptacle. Each power conversion module of the plurality of power conversion modules includes an enclosure configured to be exposed to the underwater environment. The at least one submersible power distribution system further includes at least one switchyard module selectably coupled to and uncoupled from the plurality of power conversion modules. The at least one switchyard module includes a plurality of switches configured to electrically bypass and isolate each power conversion module from the DC power source.

20 Claims, 9 Drawing Sheets

(51) Int. Cl.
  *H02B 7/00* (2006.01)
  *H02J 1/08* (2006.01)
  *H02J 3/36* (2006.01)
  *H02J 4/00* (2006.01)
  *E21B 41/08* (2006.01)
  *E21B 43/017* (2006.01)
  *H02J 1/00* (2006.01)

(52) U.S. Cl.
  CPC ............... *H02J 1/08* (2013.01); *H02J 1/102* (2013.01); *H02J 3/36* (2013.01); *H02J 4/00* (2013.01); *H02J 2001/002* (2013.01); *Y02E 60/60* (2013.01); *Y10T 29/49002* (2015.01); *Y10T 307/305* (2015.04); *Y10T 307/707* (2015.04)

(56) References Cited

U.S. PATENT DOCUMENTS

| | | |
|---|---|---|
| 7,851,943 B2 | 12/2010 | Datta et al. |
| 7,880,419 B2 | 2/2011 | Sihler et al. |
| 2009/0146603 A1 | 6/2009 | Sihler et al. |
| 2009/0296433 A1 | 12/2009 | Sihler et al. |
| 2010/0133901 A1 | 6/2010 | Zhang et al. |
| 2011/0241433 A1 | 10/2011 | Sihler et al. |
| 2012/0057308 A1 | 3/2012 | Sihler |
| 2012/0217802 A1 | 8/2012 | Kanakasabai et al. |
| 2012/0267955 A1* | 10/2012 | Zhan .............. H02J 1/06 307/31 |
| 2012/0268099 A1 | 10/2012 | Sihler et al. |
| 2013/0026831 A1 | 1/2013 | Sihler et al. |
| 2014/0347897 A1* | 11/2014 | Broussard ........... H02J 3/36 363/35 |

OTHER PUBLICATIONS

Song-Manguelle, et al. "A Modular Stacked DC Transmission and Distribution System for Long Distance Subsea Applications", Energy Conversion Congress and Exposition (ECCE), 2012 IEEE, pp. 4437-4444, Sep. 2012.

Lai et al., "Modular Stacked DC Transmission and Distribution System for Ultra-Deepwater Subsea Process", Offshore Technology Conference, Houston, TX, USA, 2013.

* cited by examiner

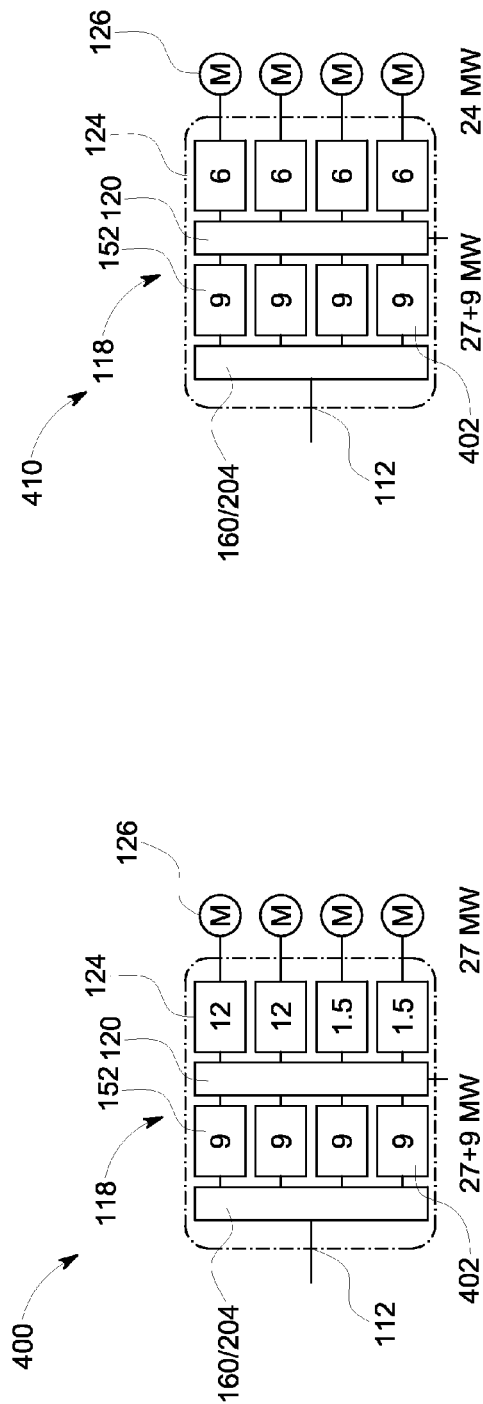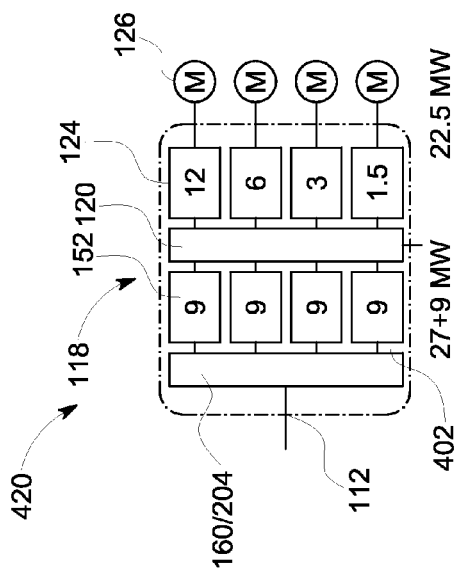
FIG. 7
FIG. 8
FIG. 9

METHODS AND SYSTEMS FOR SUBSEA DIRECT CURRENT POWER DISTRIBUTION

BACKGROUND

This description relates to power transmission and distribution, and, more particularly, to systems and methods for subsea high-voltage direct current (HVDC) transmission and distribution.

As oil and gas fields in shallow waters diminish, e.g., water depths less than approximately 500 meters (m) (1640 feet (ft.)), producers are tapping offshore fields in deeper waters, e.g., water depths of 500 m (1640 ft.) and greater. Such deep water fields not only include oil and gas production installations that operate far below the surface of the sea, but, also far away from the shore, e.g., greater than approximately 300 kilometers (km) (186 miles (mi)).

In many known subsea oil and gas production systems, typical equipment for such subsea oil and gas recovery and production includes gas compressors and pumps. Electric variable speed drive (VSD) and motor systems are one way to directly power such equipment in deep water environments. Reliable delivery of electric power from a remote utility grid or power generation source facilitates reliable production and processing of oil and gas in subsea locations. Typically, the transmission power requirement may be approximately one hundred megawatts for medium to large oil/gas fields.

As such, some known subsea oil and gas production systems are electric power intensive, and a robust, sturdy, and reliable electrical transmission and distribution (T&D) is required. Therefore, some known subsea oil and gas production systems use alternating current (AC) transmission and distribution systems for delivery of electric power to subsea locations. Such systems typically deliver AC power from a platform or terrestrial location to a subsea transformer through a power cable. Power is transferred from the subsea transformer to subsea AC switchgear through another power cable. The subsea AC switchgear feeds AC power to one or more subsea VSDs through yet another cable, or to other types of electrical loads. The VSDs each provide variable frequency AC power to electric motors through a power cable. Such AC transmission and distribution systems face technical challenges, which become more significant, e.g., when the transmission distance is in excess of one hundred kilometers. For example, the significant reactive power drawn from the distributed subsea cable capacitance restrains the power delivery capability as well as increases the system cost.

Therefore, subsea oil and gas production systems may instead use high-voltage direct current (HVDC) transmission and distribution systems for delivery of electric power to subsea locations. Such HVDC systems typically include a land-based of topside converter substation where the AC-to-DC power conversion is performed. Also, these HVDC T&D systems may include undersea DC-to-AC and DC-to-DC converter stations proximate the subsea oil and gas production systems.

The active subsea power electronics components are generally contained inside enclosures (e.g. pressure vessels) protecting them from the surrounding subsea environment. Further, as pump, motor, and distribution components increase in power and size, the weight increases. Moreover, the electrical connections between components in subsea distribution systems typically require wet-mateable connectors, which are significantly more expensive than dry-mateable connectors. Wet-mateable connectors are used to facilitate making electrical connections between components while underwater, which is in contrast to dry-mateable subsea connectors used to connect electrical components in dry environments, before the connectors are submerged. Furthermore, wet-mateable subsea DC connectors that can withstand high voltage, e. g., 50 kiloVolts (kV) DC or higher, if commercially available, would require a complex and costly design. Moreover, due to the inaccessibility of the components within the enclosures, maintenance on any one component within the enclosure typically requires completely removing the T&D system from service and raising the unitary enclosure from its subsea location onto a ship or other platform.

BRIEF DESCRIPTION

In one aspect, a submersible power system is provided. The submersible power system includes at least one DC power source and at least one submersible power distribution system electrically coupled to the at least one DC power source. The at least one submersible power distribution system includes at least one receptacle configured to be exposed to an underwater environment. The at least one submersible power distribution system also includes a plurality of power conversion modules removably positioned within the at least one receptacle. Each power conversion module of the plurality of power conversion modules includes an enclosure configured to be exposed to the underwater environment. The at least one submersible power distribution system further includes at least one switchyard module configured to be selectably coupled to and uncoupled from the plurality of power conversion modules. The at least one switchyard module includes plurality of switches configured to electrically bypass and isolate each power conversion module of the plurality of power conversion modules from the DC power source.

In another aspect, a submersible resource recovery system is provided. The submersible resource recovery system includes at least one DC power source and at least one submersible power distribution system electrically coupled to the at least one DC power source. The at least one submersible power distribution system includes at least one receptacle configured to be exposed to an underwater environment and a plurality of power conversion modules removably positioned within the at least one receptacle. Each power conversion module of the plurality of power conversion modules includes an enclosure configured to be exposed to the underwater environment. The at least one submersible power distribution system also includes at least one switchyard module configured to be selectably coupled to and uncoupled from the plurality of power conversion modules. The at least one switchyard module includes a plurality of switches configured to electrically bypass and isolate each power conversion module of the plurality of power conversion modules from the DC power source. The submersible resource recovery system also includes at least one electrical load electrically coupled to the at least one submersible power distribution system.

In a further aspect, a method of operating a submersible power distribution system is provided. The submersible power distribution system includes at least one receptacle configured to be exposed to underwater environments and configured to be located underwater. The at least one receptacle includes a plurality of power conversion modules removably positioned therein. The submersible power distribution system also includes at least one switchyard module electrically coupled to the plurality of power conversion modules through at least one HVDC connection cable. The at least one switchyard module includes a plurality of switches configured to electrically connect, bypass, and isolate each power conversion module of the plurality of power conversion modules. The method includes positioning a floating recovery platform proximately over the at least one receptacle. The floating recovery platform includes at least one lifting apparatus. The method also includes operating the plurality of switches to at least partially electrically bypass and isolate at least one power conversion module of the plurality of power conversion modules. The method further includes electrically disconnecting the at least one power conversion module of the plurality of power conversion modules from downstream loads by uncoupling at least one wet-mateable connector from the at the least one power conversion module of the plurality of power conversion modules. The method also includes coupling the lifting apparatus to the at least one power conversion module of the plurality of power conversion modules. The method further includes raising the at the least one power conversion module of the plurality of power conversion modules from the receptacle to the floating recovery platform while maintaining the at the least one power conversion module of the plurality of power conversion modules physically coupled to the at least one switchyard module through the at least one HVDC connection cable.

DRAWINGS

These and other features, aspects, and advantages of the present invention will become better understood when the following detailed description is read with reference to the accompanying drawings in which like characters represent like parts throughout the drawings, wherein:

FIG. 7 is a schematic view of a first alternative submerged electric power distribution system configuration that may be used with the submersible power system shown in FIG. 1;

FIG. 8 is a schematic view of a second alternative submerged electric power distribution system configuration that may be used with the submersible power system shown in FIG. 1;

FIG. 9 is a schematic view of a third alternative submerged electric power distribution system configuration that may be used with the submersible power system shown in FIG. 1;

Figure 1:
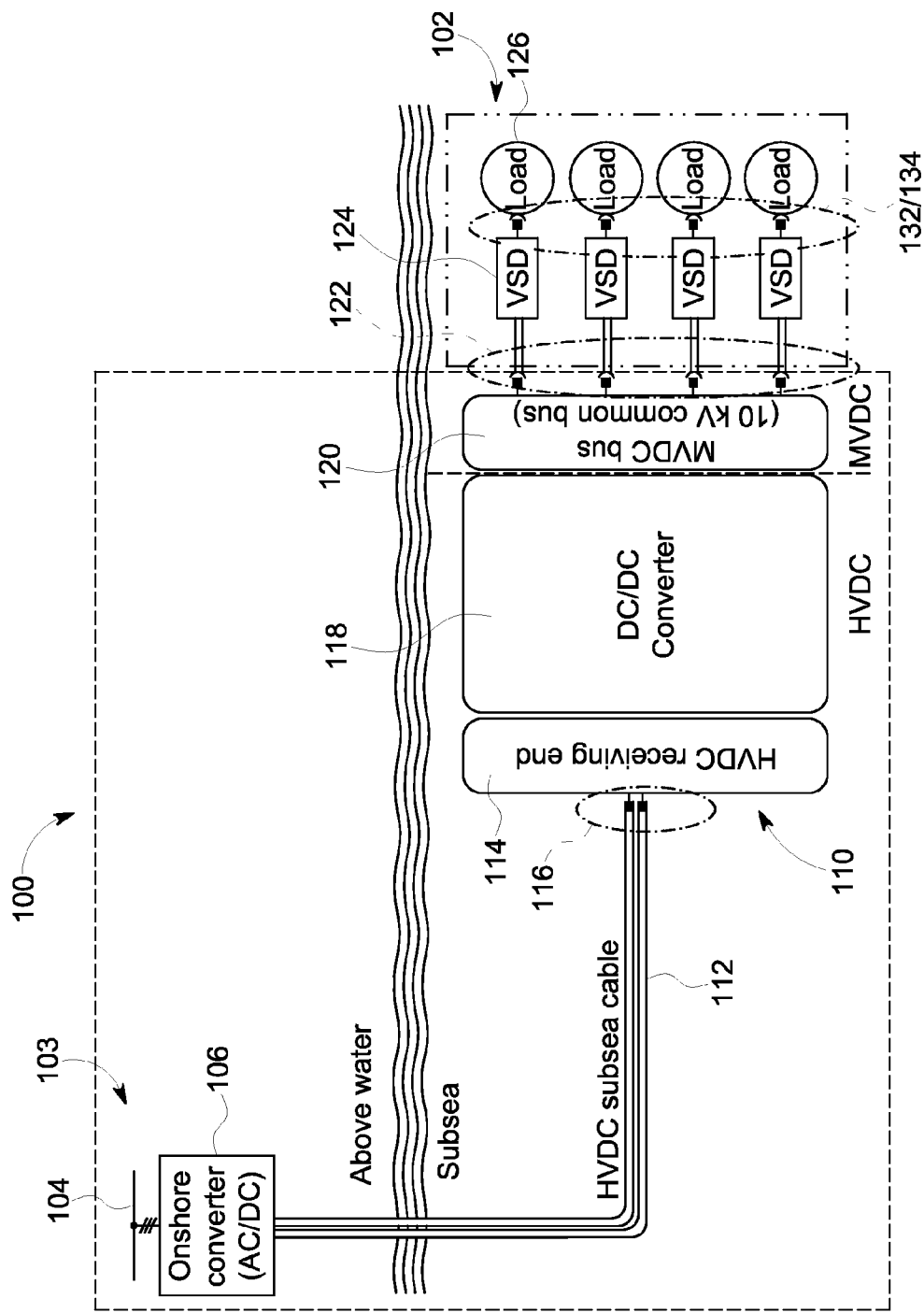
FIG. 1 is a schematic block diagram of an exemplary submersible power system and a portion of an exemplary set of electrical loads.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The submersible power distribution systems described herein provide a cost-effective method for providing electric power to submersible electrical loads. Specifically, the embodiments described herein provide for a modular structure for underwater-based direct current (DC)-to-DC and DC-to-alternating current (AC) power converters that facilitate repairs to such converters without significant disruptions of electric power to the loads. More particularly, the embodiments described herein facilitate installing, retrieving, and reinstalling portions of the underwater power distribution systems through floating platforms, robotic devices, and/or human divers to electrically bypass, isolate, and disengage the individual converter modules as necessary while maintaining the remainder of the modules in service. The submersible power distribution systems described herein use mechanical isolation and by-pass switches that are not operated under load such that they can be light-weight and low cost. In addition, connections and disconnections are facilitated on the load side of the modules through MVDC isolation switches and wet-mateable connectors for electrical and physical connection and disconnection while underwater. Furthermore, raising and lowering the modules through the underwater environment is facilitated through source-side HVDC power cables that remain coupled to the power source and the module through dry-mateable connectors during raising and lowering operations. As such, retrieval operations bring up the entire module physically coupled to, but electrically decoupled from, the power source, and physically disconnected from the downstream loads. Since the modules and associated cabling that are transited through the water are light-weight, less costly maritime assets for affecting the operations are required.

Figure 2:
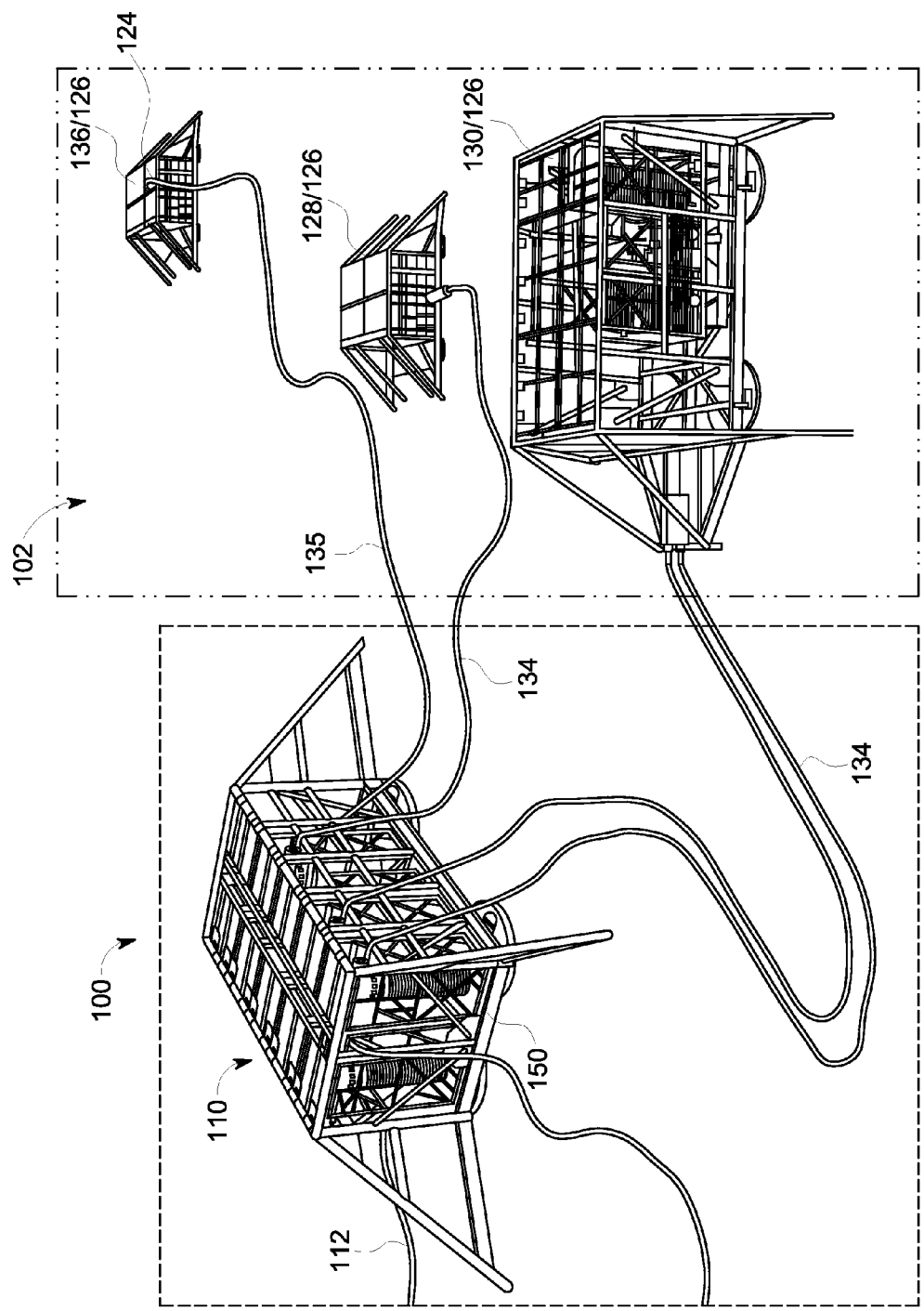
FIG. 2 is a perspective view of the submersible power system and the submersible resource recovery system shown in FIG. 1.

FIG. 1 is a schematic block diagram of an exemplary submersible power system 100 and a portion of a plurality of electrical loads 126, e.g., without limitation, an exemplary submersible resource recovery system 102. FIG. 2 is a perspective view of submersible power system 100 and submersible resource recovery system 102. In the exemplary embodiment, submersible power system 100 is shown as a stand-alone system supporting electrical loads 126 in submersible resource recovery system 102. Alternatively, submersible power system 100 distributes electric power to plurality of electric loads 126 for any operation requiring electric power in an underwater environment. Also, alternatively, submersible resource recovery system 102 includes submersible power distribution system 100. Submersible resource recovery system 102 is any resource recovery system that enables operation of submersible power distribution system 100 as described herein including, without limitation, subsea oil and gas production systems.

Submersible power distribution system 100 is powered by a direct current (DC) power source 103. In the exemplary embodiment, DC power source 103 is a platform based alternating current (AC) to DC power converter that converts AC power from an AC power source 104, e.g., without limitation, an AC power grid, to DC power. In other embodiments, DC power source 103 may be a land based DC power source, a DC power generator (whether land or platform based), or any other suitable DC power source. Also, in the exemplary embodiment, submersible power distribution system 100 includes a shore-based alternating current (AC)-to-direct current (DC) converter 106 coupled to AC source 104. AC-to-DC converter 106 receives AC power and generates and transmits high voltage DC (HVDC) electric power at any voltage and any polarity that enables operation of submersible resource recovery system 102 and submersible power distribution system 100 as described herein, e.g., without limitation, within a range between approximately ±50 kiloVolts (kV) and approximately ±100 kV. System 100 also includes at least one submersible power distribution system 110 (only one shown) coupled to AC-to-DC converter 106 through an HVDC umbilical cable 112.

Submersible power distribution system 110 includes an HVDC receiving end 114 coupled to HVDC umbilical cable 112 through a plurality of dry-mateable connectors 116. System 110 also includes a DC-to-DC converter section 118 coupled to HVDC receiving end 114. DC-to-DC converter section 118 converts the HVDC voltage to medium voltage DC (MVDC), e.g., and without limitation, approximately ±10 kV. System 110 further includes a MVDC bus 120 coupled to DC-to-DC converter section 118. System 110 also includes a plurality of wet-mateable MVDC connectors 122. In some alternative embodiments, a DC-to-AC converter section is used rather than DC-to-DC converter section 118.

Submersible resource recovery system 102 includes a plurality of variable speed drive (VSD) units 124 coupled to MVDC bus module 120 through wet-mateable MVDC connectors 122. Each VSD unit 124 is coupled to an electric power consuming device, i.e., one of loads 126, e.g., without limitation, electrical motors driving pumping station 128 and compressor station 130 through a wet-matable AC connector 132 and subsea AC cable 134. System 102 may also include other devices coupled directly to MVDC bus module 120 through a subsea MVDC cable 135, including, without limitation, a remote station 136 including its own local VSD unit 124.

Figure 3:
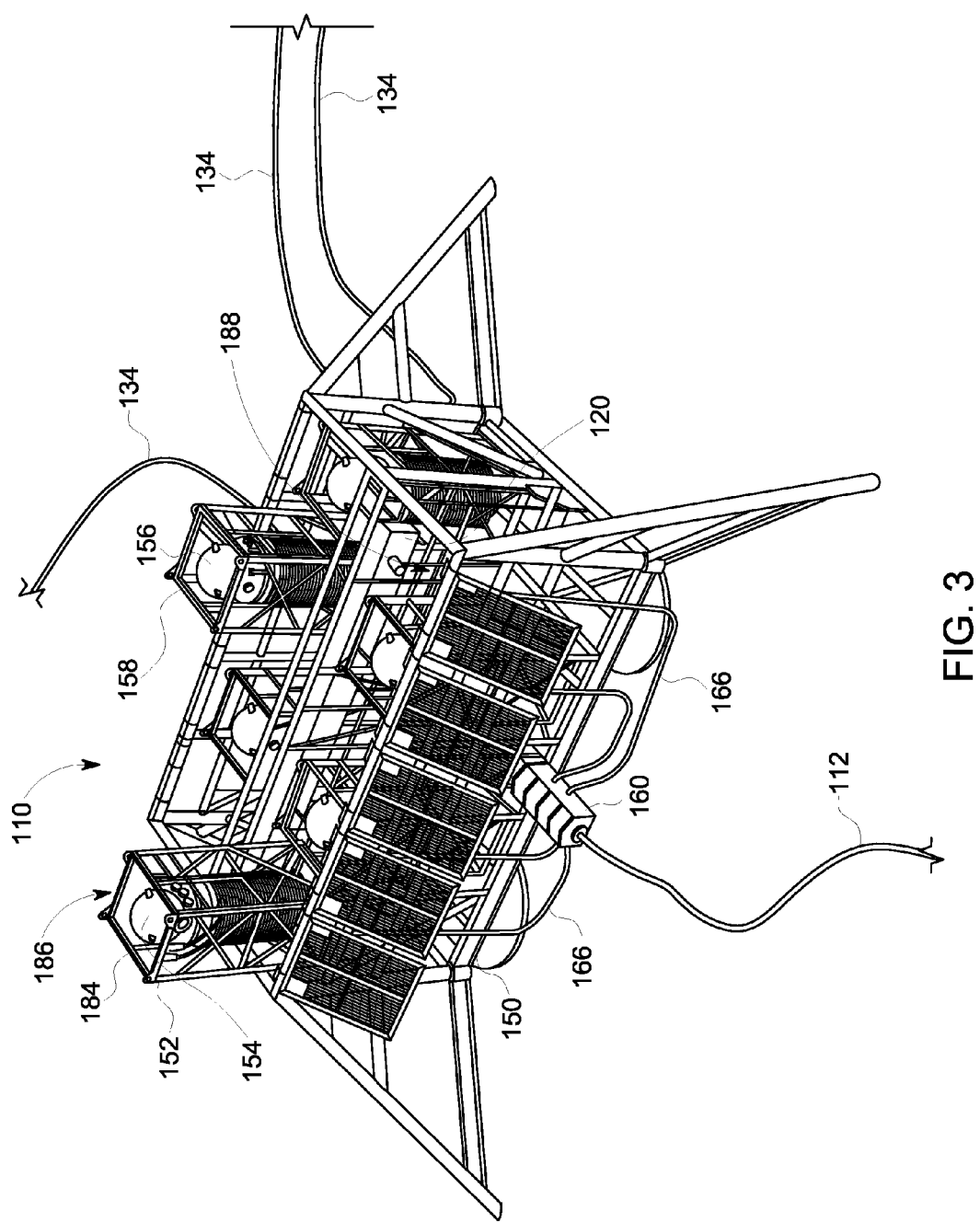
FIG. 3 is a perspective view of an exemplary submersible power distribution system that may be used with the submersible power system shown in FIG. 2.
Figure 4:
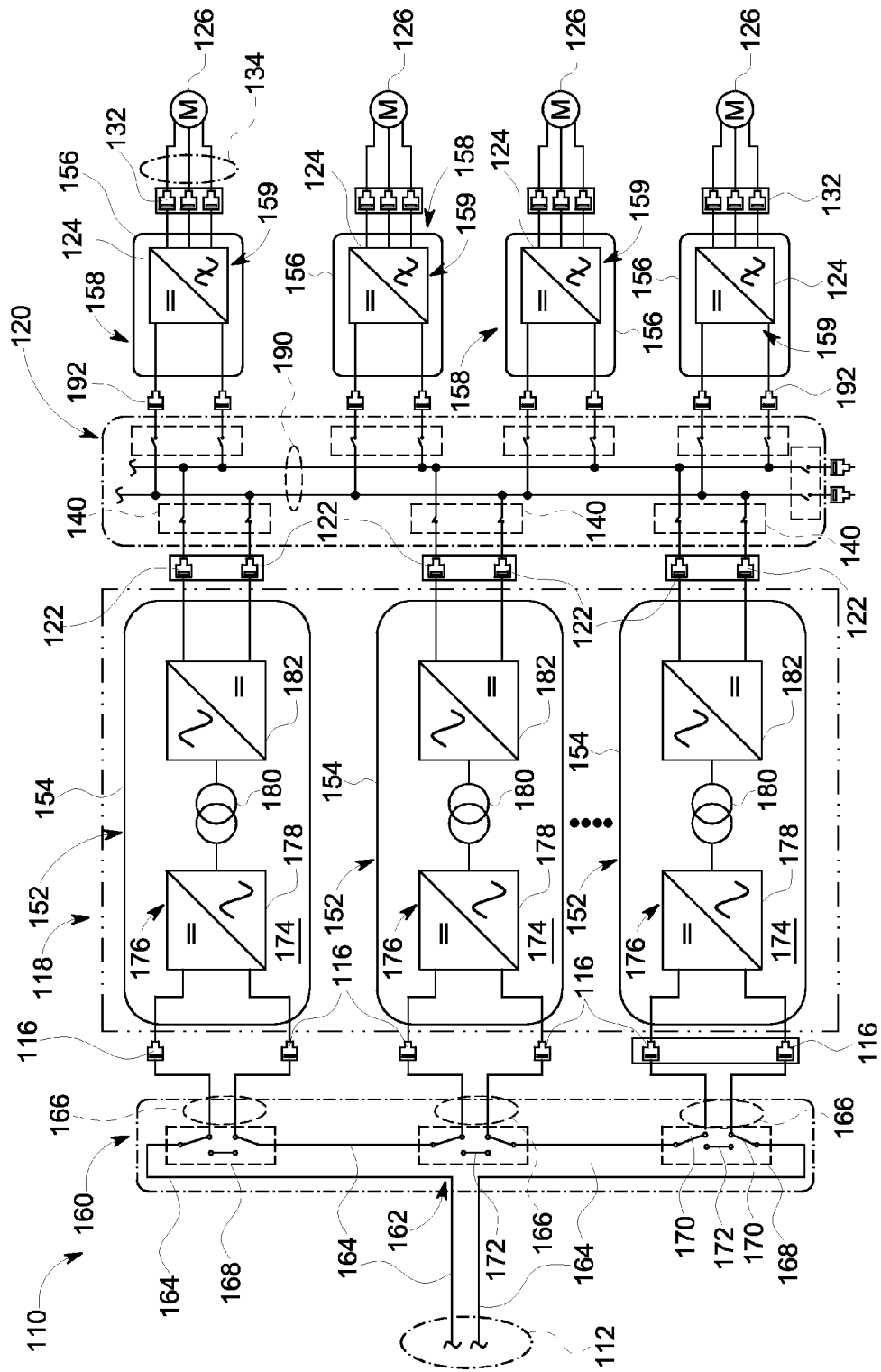
FIG. 4 is a schematic view of the submersible power distribution system shown in FIG. 3.

FIG. 3 is a perspective view of submersible power distribution system 110 and FIG. 4 is a schematic view of submersible power distribution system 110. FIGS. 3 and 4 show embodiments that include a plurality of VSD unit 124. System 110 includes a receptacle 150 configured to be exposed to an underwater environment with a subsea template, i.e., receptacle 150 is open to water. System 110 also includes a plurality of DC-to-DC power conversion modules 152 removably positioned within receptacle 150. Power conversion modules 152 form DC-to-DC converter section 118. Each power conversion module 152 includes at least one an enclosure 154 configured to be exposed to the underwater environment. In some embodiments, enclosure 154 is a pressure vessel. Each power conversion module 152 also includes an interior chamber that houses power electronics (neither shown in FIG. 3), discussed further below.

In the exemplary embodiment, receptacle 150 houses DC-to-DC power conversion modules 152 and variable speed drive (VSD) modules 158. VSD modules 158 include an enclosure 156 defining an interior chamber 159 housing a VSD unit 124. In the illustrated embodiment shown in FIG. 3, system 110 includes three DC-to-DC power conversion modules 152 and three VSD modules 158. In the example schematic view shown in FIG. 4, system 110 only three DC-to-DC power conversion modules 152 are shown. In other embodiments, system 110 includes more or fewer subsea power conversion modules 152. The number of power conversion modules 152 is generally selected based on the total accumulated size of the powered loads. Additional power conversion modules 152 may be included in one receptacle 150 to provide back-up redundancy in case of failure of one or several power conversion modules 152. Also, in some embodiments, a plurality of receptacles 150 are used and each receptacle is configured to receive only one or several subsea conversion modules 152.

Submersible power conversion system 110 further includes at least one HVDC switchyard input module 160 (only one shown) electrically coupled to power conversion modules 152. DC switchyard input module 160 includes at least one HVDC input circuit 162 electrically connecting HVDC umbilical cable 112 to one or several DC supply, or input circuits, generally shown as 164, connected in series or in parallel to switchyard outputs, or HVDC connections 166, thus connecting HVDC umbilical cable 112 to power conversion modules 152. In the exemplary embodiment, module 160 also includes a plurality of diverter switches 168 inserted in HVDC input circuit 162, i.e., one diverter switch 168 coupled to one power conversion module 152 through one set of HVDC connections 166. Each diverter switch 168 includes a pair of combined bypass and isolation contactors 170 coupled to HVDC input circuit 162.

In addition, combined bypass and isolation contactors 170 are each coupled to a bypass circuit 172 when diverter switch 168 is shifted to a bypass and isolate mode. Furthermore, bypass and isolation combination contactors 170 are each coupled to a HVDC connection 166 when diverter switch 168 is shifted to a module connection mode. Alternatively, rather than diverter switches 168, DC switchyard input module 160 includes separate bypass switches and separate isolation switches for each power conversion module 152 (discussed further below).

As described above, each power conversion module 152 includes at least one enclosure 154 configured to be exposed to the underwater environment defining an interior chamber 174. With respect to DC-to-DC conversion modules 152, pressure vessel 154 is configured to maintain a plurality of internal power electronics 176 within interior chamber 174 in conditions that enable operation of submersible power distribution system 110 as described herein. Each enclosure 154 is positioned within a module support structure 184. Enclosure 154 coupled to a module support structure 184 with internal power electronics 176 positioned within interior chamber 174 constitute a DC-to-DC conversion module 152. Each DC-to-DC conversion module 152 is rated for approximately 9 megawatts (MW). Alternatively, DC-to-DC power conversion modules 152 have any power ratings in any combination that enable operation of submersible power distribution system 110 as described herein. In some embodiments, in order to decrease the number of power conversion modules 152 and enclosures 154, a plurality of internal power electronics 176 are positioned within a single interior chamber 174 defined by a single, larger enclosure.

Such internal power electronics 176 includes a DC-to-AC power converter 178, e.g., and without limitation, insulated-gate bipolar transistors (IGBTs) and thyristors with anti-paralleling diodes. DC-to-AC power converter 178 is coupled to switchyard 160 through HVDC connections 166 and convert the HVDC power to high-frequency AC power, i.e., AC power at a frequency of approximately 500 Hz and approximately 50 kV AC to 100 kV AC, thereby facilitating decreasing the size and weight of power conversion modules 152. Internal power electronics 176 also include a high-frequency transformer 180 coupled to DC-to-AC power converter 178. High-frequency transformer 180 converts the high-voltage, high-frequency AC power to medium-voltage, high-frequency AC power, e.g., approximately 10 kV AC at 500 Hz. Power components 176 further include an AC-to-DC converter 182, e.g., a diode rectifier coupled to high-frequency transformer 180. AC-to-DC converter 182 converts the medium-voltage, high-frequency AC power to medium-voltage DC power at approximately 10 kV DC. DC-to-DC conversion module 156 also includes any combination of filtering devices (not shown) that enable operation of DC-to-DC conversion module 156 as described herein. In addition, alternative embodiments of DC-to-DC conversion module 156 have any configuration of power components that enables operation of DC-to-DC conversion module 156 as described herein.

Each power conversion module 152 also includes a module support structure 184 that extends about enclosure 154. Each enclosure 154 is coupled to an associated support structure 184 to facilitate ease of installation and removal of modules 152 as an integrated unit 186. Also, each integrated unit 186 is configured to fit within one of several empty module bays 188 within receptacle 150 that are configured to either receive any and all uniformly-sized integrated units 186 or uniquely-sized integrated units 186.

Submersible power distribution system 110 further includes MVDC bus module 120 that includes at least one MVDC bus 190 (only one shown) coupled to the output of one or several DC-to-DC modules 152 through wet-mateable MVDC connectors 122. Also, MVDC bus 190 is coupled to VSD units 124 through wet-mateable connectors 192 similar to wet-mateable MVDC connectors 122. All wet mateable inputs and outputs of MVDC bus module 120 can be electrically isolated by means of isolation switches 140 so as to allow operation with one or several wet mateable connectors 122/192 disconnected, i.e. exposed to surrounding water.

In the exemplary embodiment, VSD units 124 are rated for power draws between 1.5 MW and 12 MW. VSD units 124 are all coupled to a common bus, i.e., MVDC bus 190, and draw a combined 22.5 MW, the combined output of DC-to-DC converter section 118 of 27 MW is sufficient. These values are for illustration only and a greater margin of available capacity to load facilitates continued unaffected operation of systems 100 and 102 while a power conversion module 152 is removed as described further below.

In the exemplary embodiment, submersible power distribution system 110 includes a plurality of power conversion module 152 within DC-to-DC converter section 118 that are electrically coupled together through DC switchyard input module 160. Also, each power conversion module 152 is electrically isolable from the other power conversion modules 152 through the use of diverter switches on the power supply side of power conversion modules 152 and wet-mateable MVDC connectors 122 and isolation switched 140 on the load side of power conversion modules 152.

Figure 5:
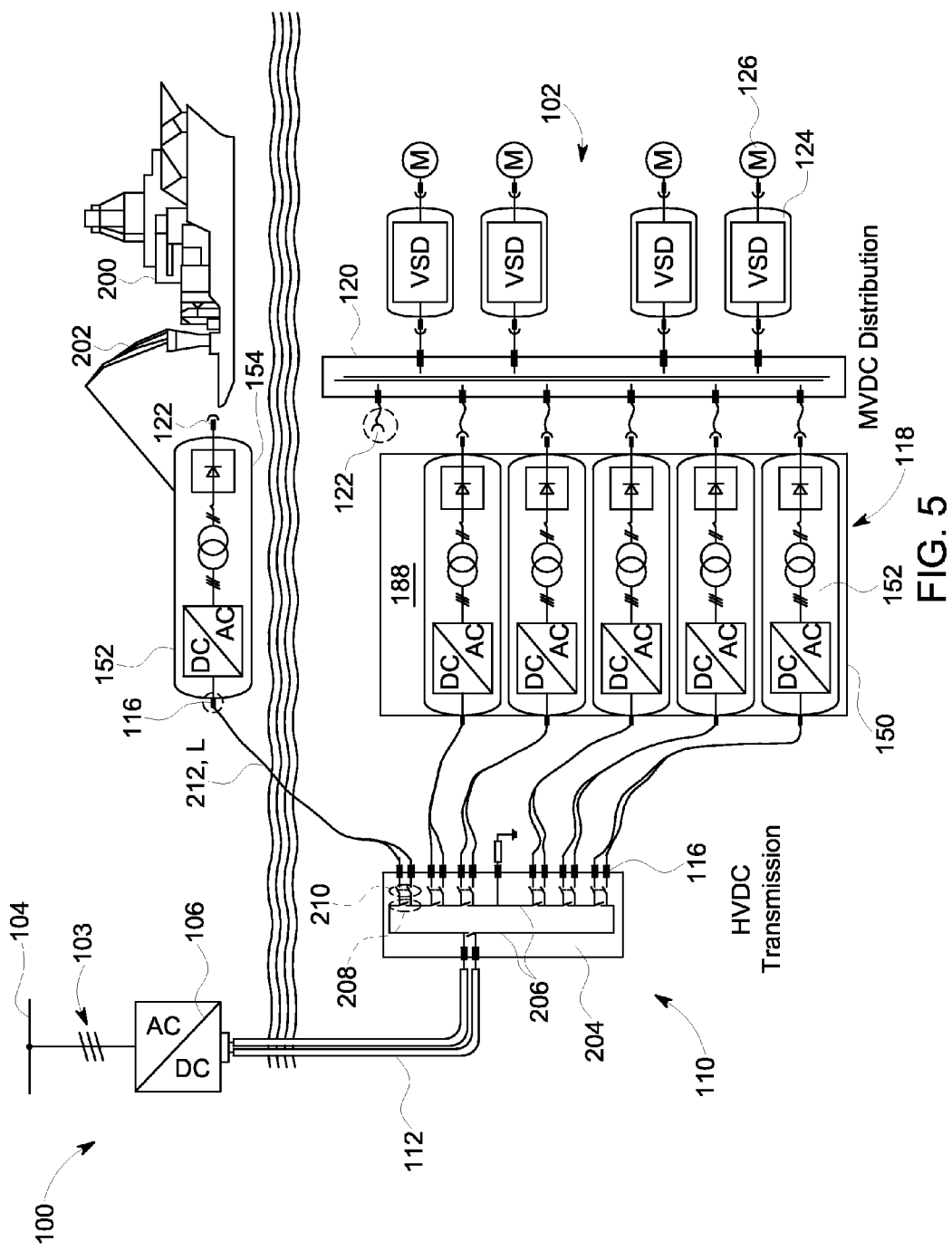
FIG. 5 is schematic view of an operation to lift an exemplary power conversion module that may be used with the submersible power distribution system shown in FIGS. 3 and 4 onto a floating recovery platform.

FIG. 5 is a schematic view of an operation to lift a power conversion module 152 onto a surface-floating recovery platform 200. In the exemplary embodiment, floating platform 200 is a ship including a lifting apparatus 202. Alternatively, platform 200 is any platform that enables operation of submersible power distribution system 110 as described herein, including, without limitation, a gas and/or oil well platform, i.e., rig, and a barge. An alternative DC switchyard input module 204 is used in lieu of DC switchyard input module 160 (shown in FIGS. 3 and 4). Module 204 includes a plurality of separate bypass switches 208 and a plurality of separate isolation switches 210 coupled to at least of DC supply circuit 206. Each isolation switch 210 includes a plurality of contactors 211. In the exemplary embodiment, each power conversion module 152 has an associated bypass switch 208 and an associated isolation switch 210. Similar to diverter switches 168 (shown in FIG. 4), bypass switches 208 and a plurality of separate isolation switches 210 do not need to be designed to operate under load and they can perform their tasks as slow-acting switches.

When power conversion module 152 is electrically coupled to DC power source 103, i.e., in a module connection mode, the associated bypass switch 208 is in the open position and the associated isolation switch 210 is in the closed position. Also, when power conversion module 152 is electrically removed from service with respect to DC power source 103, i.e., a bypass and isolate mode, the associated bypass switch 208 is in the closed position and the associated isolation switch 210 is in the open position, and the associated isolation switch 140 in MVDC bus 120 is in the open position.

Submersible power distribution system 110 also includes a long HVDC connection cable 212 coupled to DC switchyard input module 204 and power conversion module 152 through dry-mateable connectors 116. Cable 212 has a length L that that facilitates raising power conversion module 152 from its module bay 188 in receptacle 150 to surface-floating recovery platform 200 without disconnecting cable 212 from switchyard module 204 and power conversion module 152. Such a length L may be determined, for example, and without limitation, by multiplying the known depth of water in the vicinity of system 110 by a factor of 1.3. Also, if necessary, i.e., if the combined weight of power conversion module 152 and long HVDC connection cable 212 causes difficulty in lifting power converter module 152, floatation devices (not shown) may be attached to power conversion module 152 and/or long HVDC connection cable 212 to increase buoyancy.

In operation, floating recovery platform 200 is positioned proximately over receptacle 150. A human diver and/or a submersible robot (neither shown) are used to prepare the predetermined power conversion module 152 for transport to platform 200 from its present underwater location. If the affected power conversion module 152 is still in operation, loads on the affected power conversion module 152 are reduced. This step is not necessary if the affected power conversion module 152 is out of service due to a malfunction. For DC switchyard input module 160, diverter switch 168 is shifted to a bypass and isolate mode, i.e., switch 168 is opened and power conversion module 152 is electrically isolated from module 160. The unaffected power conversion modules 152 are maintained in service and are substantially unaffected. For DC switchyard input module 204, the associated bypass switch 208 is shifted from the open position to the closed position, thereby electrically bypassing affected module 152. The associated isolation switch 210 is shifted from the closed position to the open position, thereby electrically isolating module 152. Power conversion module 152 is electrically disconnected from MVDC bus module 120 by opening the isolation switch 140 and uncoupling the associated wet-mateable MVDC connector 122. Lifting apparatus 202 is coupled to a coupling mechanism on pressure vessel 154 of the affected power conversion module 152 and module 152 is raised from module bay 188 of receptacle 150 to floating recovery platform 200 while maintaining power conversion module 152 coupled to switchyard module 160/204 through long HVDC connection cable 212.

Once maintenance on the affected power conversion module 152 is complete, or a replacement module 152 is to be used, the methods described above are substantially reversed. Module 152 is lowered from floating recovery platform 200 to an empty module bay 188 of receptacle 150 through lifting apparatus 202 while maintaining power conversion module 152 coupled to switchyard module 160/204 through long HVDC connection cable 212. Once in place, lifting apparatus 202 is uncoupled from power conversion module 152. Power conversion module 152 is electrically reconnected to MVDC bus module 120 by coupling the associated wet-mateable MVDC connector 122. For DC switchyard input module 160, diverter switch 168 is shifted to from the bypass and isolate mode, i.e., switch 168 is closed and power conversion module 152 is electrically reconnected to module 160. For DC switchyard input module 204, the associated isolation switch 210 is shifted from the open position to the closed position, thereby electrically unisolating module 152. The associated bypass switch 208 is shifted from the closed position to the open position, thereby electrically removing the bypassing of module 152. Thereafter, isolation switch 140 in MVDC bus module 120 is closed.

Figure 6:
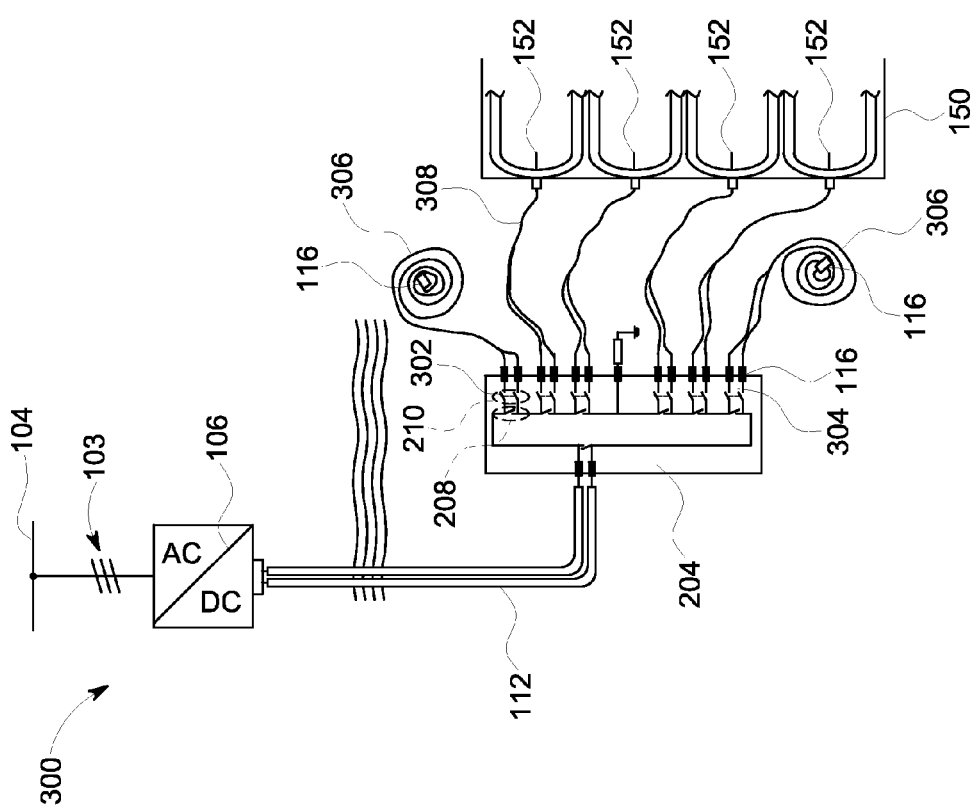
FIG. 6 is a schematic view of a portion of an alternative submersible power distribution system that may be used with the submersible resource recovery system shown in FIG. 1.

FIG. 6 is a schematic view of a portion of an alternative submersible power distribution system 300 that includes at least one additional, spare output 302 in DC switchyard input module 204. In this alternative embodiment, a second additional, spare output 304 is shown. A spare long HVDC cable 306 is coupled to each of spare outputs 302 and 304. Cables 306 are of the same length as long cable 212 described above. Each cable 306 includes a dry-mateable connector 116. During normal operation of system 300, cables 306 are bypassed and isolated, i.e., bypass switch 208 is closed and isolation switch 210 is open. Alternative submersible power distribution system 300 also includes a plurality of short HVDC connection cables 308 that are only a few meters in length, thereby decreasing the overall weight and cost of system 300. However, the method described above for bringing a power conversion module 152 topside is not possible.

In the event of a condition that requires unplanned maintenance in any of power conversion modules 152, that module 152 is by-passed and isolated as described above. Then original short cable 308 is cut and the affected module 152 is raised topside (after the affected wet-mateable MVDC connector 122 (shown in FIG. 5) is disconnected and MVDC bus 120 isolator switch 140 (shown in FIG. 4) is opened). Also, one of spare long cables 306 is raised topside. Once the affected module 152 is repaired or replaced, it is connected to the topside end of spare long cable 306 by dry-mateable connection 116. Module 152 and long cable 306 are lowered back down into the water and module 152 is positioned within an empty bay 188. The associated wet-matable MVDC connector 122 is reconnected and module 152 is unisolated, no longer bypassed, and placed in service, although, with a much longer cable 306. This procedure is only foreseen in the unlikely case that unplanned maintenance is needed on a module 152 and can be repeated as often as spare long cables 306 are available, i.e., twice in this embodiment.

FIG. 7 is a schematic view of a first alternative submerged electric power distribution system configuration 400 that may be used with submersible power system 100 (shown in FIG. 1). Configuration 400 includes an HVDC switchyard input module 160/204 coupled to HVDC umbilical cable 112. Configuration 400 also includes a DC-to-DC converter section 118 that includes three DC-to-DC conversion modules 152 coupled to module 160/204 and MVDC bus module 120. MVDC bus module 120 is coupled to four VSD units 124 that are each coupled to a load 126. Configuration 400 further includes a redundant DC-to-DC conversion module 402 coupled to module 160/204 and MVDC bus module 120. In alternative configuration 400, each of the three DC-to-DC conversion modules 152 is rated for 9 MW for a total rating of 27 MW and redundant DC-to-DC conversion module 402 is also rated for 9 MW. Also, in alternative configuration 400, two of VSD units 124 are rated for 12 MW and two of VSD units 124 are rated for 1.5 MW, for a total rating of 27 MW. One example of an application for configuration 400 is a dual compression station (not shown).

FIG. 8 is a schematic view of a second alternative submerged electric power distribution system configuration 410 that may be used with submersible power system 100 (shown in FIG. 1). Configuration 410 is similar to configuration 400 (shown in FIG. 7), with the exception that the four VSD units 124 are each rated 6 MW for a total rating of 24 MW. One example of an application for configuration 410 is a quad pumping station (not shown).

FIG. 9 is a schematic view of a third alternative submerged electric power distribution system configuration 420 that may be used with submersible power system 100 (shown in FIG. 1). Configuration 420 is similar to configurations 400 (shown in FIGS. 7) and 410 (shown in FIG. 8), with the exception that the four VSD units 124 are each rated for 12 MW, 6 MW, 3 MW, and 1.5 MW, respectively, for a total rating of 22.5 MW. One example of an application for configuration 420 is any station with a variety of load sizes.

Figure 10:
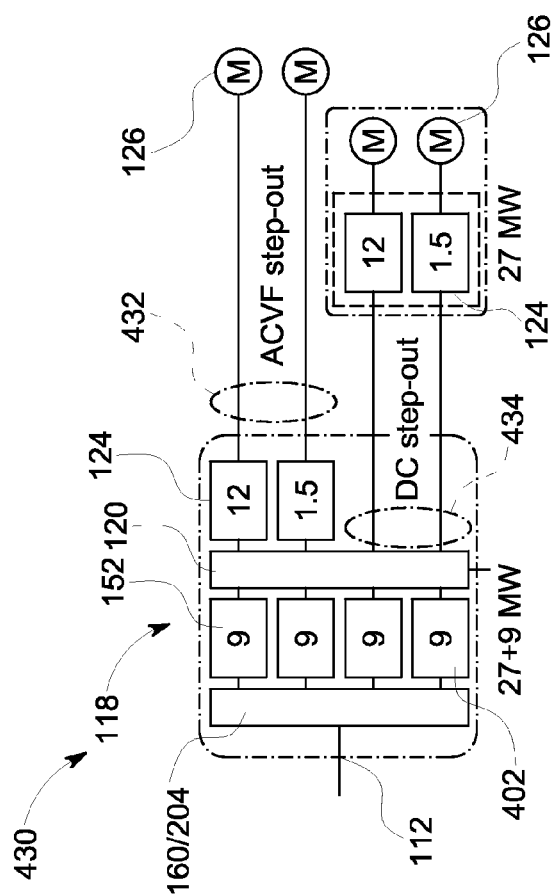
FIG. 10 is a schematic view of a fourth alternative submerged electric power distribution system configuration that may be used with the submersible power system shown in FIG. 1.

FIG. 10 is a schematic view of a fourth alternative submerged electric power distribution system configuration 430 that may be used with submersible power system 100 (shown in FIG. 1). Configuration 430 is similar to configuration 420 (shown in FIG. 9), with the exception that the four VSD units 124 are configured in pairs, each pair including a 12 MW and 1.5 MW VSD unit 124. The first pair of VSD units 124 is coupled to their associated loads 126 through an AC variable frequency (VF) step-out 432. The second pair of VSD units 124 is coupled to their associated loads 126 and MVDC bus module 120 through a DC step-out 434.

Figure 11:
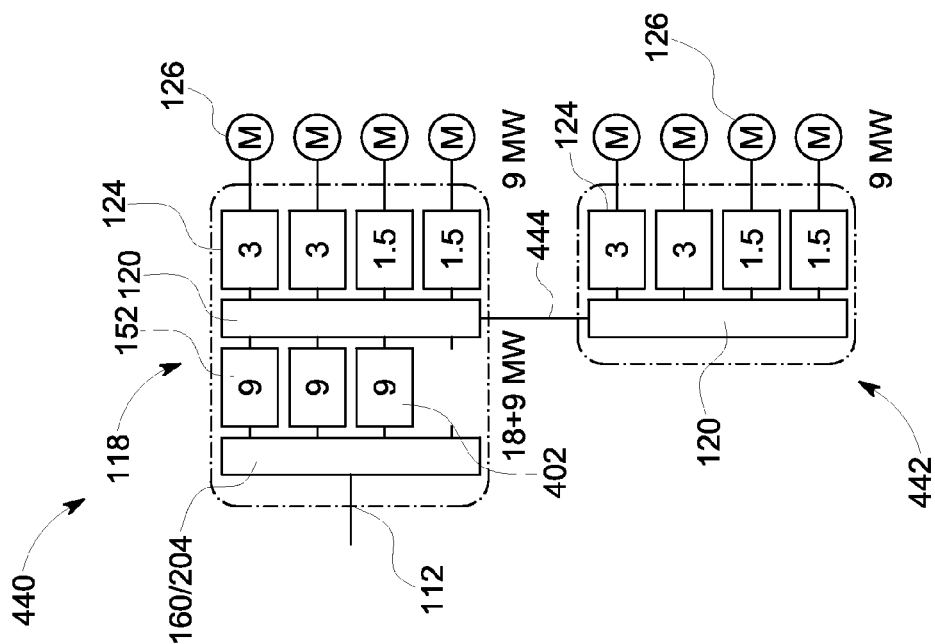
FIG. 11 is a schematic view of a fifth alternative submerged electric power distribution system configuration that may be used with the submersible power system shown in FIG. 1.

FIG. 11 is a schematic view of a fifth alternative submerged electric power distribution system configuration 440 that may be used with submersible power system 100 (shown in FIG. 1). Configuration 440 is similar to configuration 400 (shown in FIG. 7), with the exception that configuration 440 includes only two DC-to-DC conversion modules 152, each rated for 9 MW and a first pair of VSD units 124 rated for 3 MW and a second pair of VSD units 124 rated for 1.5 MW. Configuration 440 also includes an extension receptacle 442 coupled to MVDC bus module 120 through a DC bus extension cable 444. Extension receptacle 442 is configured with MVDC bus module 120 and a first pair of VSD units 124 rated for 3 MW and a second pair of VSD units 124 rated for 1.5 MW.

Figure 12:
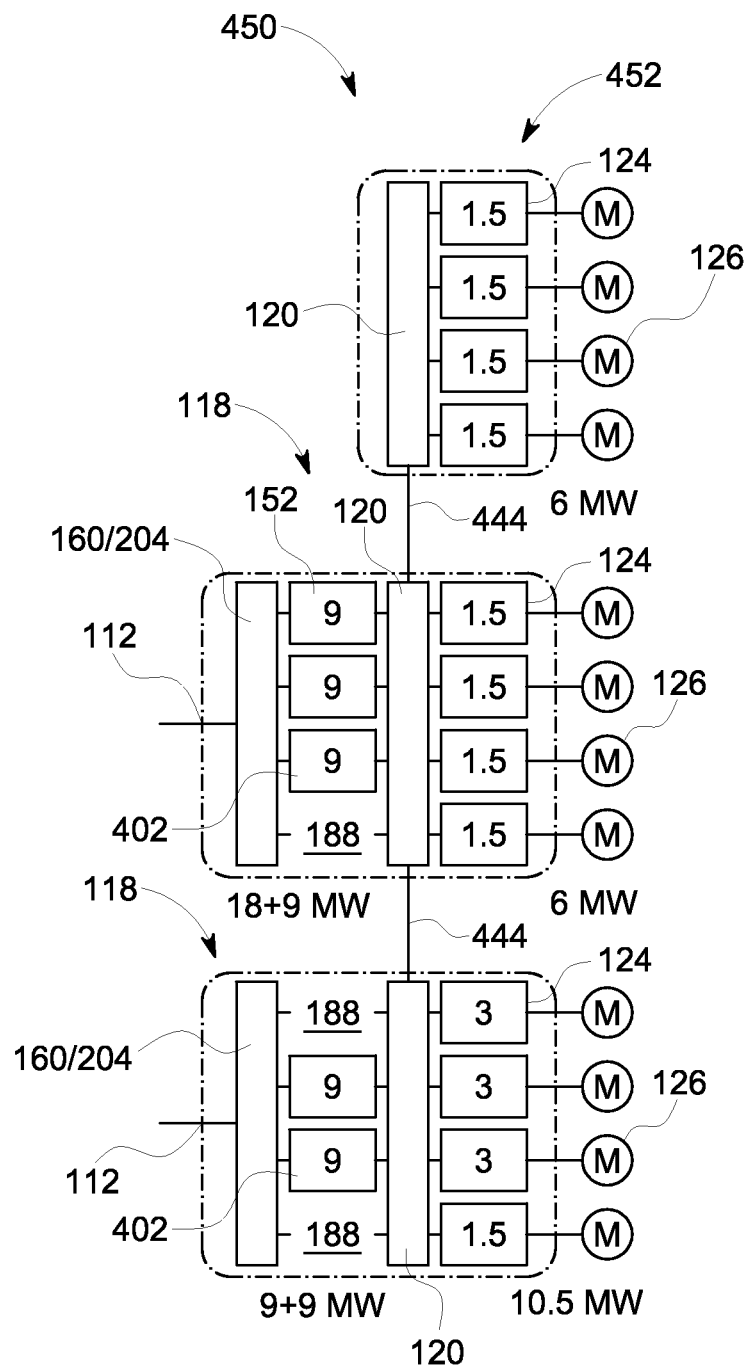
FIG. 12 is a schematic view of a sixth alternative submerged electric power distribution system configuration that may be used with the submersible power system shown in FIG. 1.

FIG. 12 is a schematic view of a sixth alternative submerged electric power distribution system configuration 450 that may be used with submersible power system 100 (shown in FIG. 1). Configuration 450 includes receptacles 150 each containing one DC-to-DC converter section 118 each coupled to an HVDC subsea cable 112 and each including an empty module bay 188. DC-to-DC converter sections 118 are coupled to each other through a DC bus extension cable 444 coupled to the respective MVDC bus modules 120. Configuration 450 also includes an extension receptacle 452 coupled to one of MVDC bus modules 120 through a DC bus extension cable 444. One example of an application for configuration 450 is a load cluster with a large number of loads 126.

Referring to FIGS. 7 through 12, a small sampling of different configurations is shown. Also, the MW ratings are exemplary. As such, any configuration of the electric power distribution systems described herein, with any power ratings, may be used to power submersible loads.

The above-described submersible power distribution systems provide a cost-effective method for providing electric power to electrical loads such as e.g. motors powering submersible resource recovery systems. Specifically, the embodiments described herein provide for a modular structure for underwater-based direct current (DC)-to-DC and DC-to-alternating current (AC) power converters that facilitate repairs to such converters without significant disruptions of electric power to the powered loads. More particularly, the embodiments described herein facilitate installing, retrieving, and reinstalling portions of the underwater converters through floating platforms, robotic devices, and/or human divers to electrically bypass, isolate, and disengage the individual converter modules as necessary while maintaining the remainder of the modules in service. The submersible power distribution systems described herein may use slow-acting mechanical isolation and by-pass switches that are not operated under load such that they can be light-weight and low cost. In addition, connections and disconnections are facilitated on the load side of the modules through wet-mateable connectors. Furthermore, raising and lowering the modules through the underwater environment is facilitated through light-weight power source-side cables that remain coupled to the power source and the module through dry-mateable connectors during raising and lowering operations. As such, retrieval operations bring up the entire module physically coupled to, but electrically decoupled from, the power source.

An exemplary technical effect of the methods, systems, and apparatus described herein includes at least one of: (a) substantially decreasing the weight-lifting requirements associated with underwater installations and retrievals of submersible power distribution systems; (b) decreasing a time span from arrival of a floating recovery platform proximate a submersible power distribution system for a submersible resource recovery system until replacement of the affected power conversion module(s); and (c) substantially reducing a potential for electric power interruptions to submersible resource recovery systems, thereby decreasing a negative impact on recovery operations.

Exemplary embodiments of submersible power distribution systems for transmitting electric power to submersible electrical loads through submersible power distribution systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring underwater electric power transmission and the associated methods, and are not limited to practice with only the distribution systems and methods as described herein. Rather, the exemplary embodiment can be implemented and utilized in connection with many other distribution applications that are currently configured to transmit and receive electric power, e.g., and without limitation, distribution systems in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A submersible power system comprising:
    at least one DC power source; and
    at least one submersible power distribution system electrically coupled to said at least one DC power source, said at least one submersible power distribution system comprising:
        at least one receptacle configured to be exposed to an underwater environment;
        a plurality of power conversion modules removably positioned within said at least one receptacle, each power conversion module of said plurality of power conversion modules comprising an enclosure configured to be exposed to the underwater environment; and
        at least one switchyard module configured to be selectably coupled to and uncoupled from said plurality of power conversion modules, said at least one switchyard module comprising a plurality of switches configured to electrically bypass and isolate said each power conversion module of said plurality of power conversion modules from said DC power source.

2. The system in accordance with claim 1, wherein said at least one switchyard module further comprises a DC circuit comprising:
   at least one DC circuit coupled to said at least one DC power source;
   a plurality of DC bypass circuits, each DC bypass circuit of said plurality of DC bypass circuits configured to be coupled to said at least one DC supply circuit to bypass at least one power conversion module of said plurality of power conversion modules; and
   a plurality of DC connection circuits coupled to said at least one power conversion module of said plurality of power conversion modules.

3. The system in accordance with claim 2, wherein said plurality of switches comprises a plurality of diverter switches, each diverter switch of said plurality of diverter switches comprising a plurality of contactors coupled to said at least one DC supply circuit and configured to be coupled to:
   at least one DC bypass circuit of said plurality of DC bypass circuits to remove said at least one power conversion module of said plurality of power conversion modules from service; and
   said plurality of DC connection circuits to place said at least one power conversion module of said plurality of power conversion modules into service.

4. The system in accordance with claim 1, wherein said at least one switchyard module further comprises a DC circuit comprising:
   at least one DC supply circuit coupled to said at least one DC power source; and
   a plurality of DC connection circuits coupled to at least one power conversion module of said plurality of power conversion modules.

5. The system in accordance with claim 4, wherein said plurality of switches comprises:
   a plurality of DC bypass switches, each DC bypass switch of said plurality of DC bypass switches configured to be coupled to said at least one DC supply circuit to bypass said at least one power conversion module of said plurality of power conversion modules; and
   a plurality of DC isolation switches, each DC isolation switch of said plurality of DC isolation switches comprising a plurality of contactors coupled to said at least one DC supply circuit and configured to be coupled to said plurality of DC connection circuits to place said at least one power conversion module of said plurality of power conversion modules into service.

6. The system in accordance with claim 1 further comprising at least one cable coupled to said at least one switchyard module and said at least one power conversion module of said plurality of power conversion modules, said at least one cable having a length that facilitates raising said at least one power conversion module of said plurality of power conversion modules from said at least one receptacle to a surface-floating recovery platform without disconnecting said at least one cable from said at least one switchyard module and said at least one power conversion module of said plurality of power conversion modules.

7. The system in accordance with claim 6 further comprising at least one dry-mateable connector coupled to said at least one switchyard module and said at least one power conversion module of said plurality of power conversion modules.

8. The system in accordance with claim 1 further comprising at least one electric power distribution device coupled to said plurality of power conversion modules through a plurality of wet-mateable connectors.

9. The system in accordance with claim 1, wherein said plurality of power conversion modules are electrically coupled together in parallel and each power conversion module of said plurality of power conversion modules is electrically isolable from the other said power conversion modules.

10. A submersible resource recovery system comprising:
   at least one DC power source; and
   at least one submersible power distribution system electrically coupled to said at least one DC power source, said at least one submersible power distribution system comprising:
      at least one receptacle configured to be exposed to an underwater environment;
      a plurality of power conversion modules removably positioned within said at least one receptacle, each power conversion module of said plurality of power conversion modules comprising an enclosure configured to be exposed to the underwater environment; and
      at least one switchyard module configured to be selectably coupled to and uncoupled from said plurality of power conversion modules, said at least one switchyard module comprising a plurality of switches configured to electrically bypass and isolate said each power conversion module of said plurality of power conversion modules form said DC power source; and
   at least one electrical load electrically coupled to said at least one submersible power distribution system.

11. The system in accordance with claim 10, wherein said at least one switchyard module further comprises a DC circuit comprising:
   at least one DC supply circuit coupled to said at least one DC power source;
   a plurality of DC bypass circuits, each DC bypass circuit of said plurality of DC bypass circuits configured to be coupled to said at least one DC supply circuit to bypass at least one power conversion module of said plurality of power conversion modules; and
   a plurality of DC connection circuits coupled to said at least one power conversion module of said plurality of power conversion modules.

12. The system in accordance with claim 11, wherein said plurality of switches comprises a plurality of diverter switches, each diverter switch of said plurality of diverter switches comprising a plurality of contactors coupled to said at least one DC supply circuit and configured to be coupled to:
   at least one DC bypass circuit of said plurality of DC bypass circuits to remove said at least one power conversion module of said plurality of power conversion modules from service; and
   said plurality of DC connection circuits to place said at least one power conversion module of said plurality of power conversion modules into service.

13. The system in accordance with claim 10, wherein said at least one switchyard module further comprises a DC circuit system comprising:
   at least one DC supply circuit coupled to said at least one DC power source; and a plurality of DC connection circuits coupled to at least one power conversion module of said plurality of power conversion modules.

14. The system in accordance with claim 13, wherein said plurality of switches comprises:
a plurality of DC bypass switches, each DC bypass switch of said plurality of DC bypass switches configured to be coupled to said at least one DC supply circuit to bypass said at least one power conversion module of said plurality of power conversion modules; and
a plurality of DC isolation switches, each DC isolation switch of said plurality of DC isolation switches comprising a plurality of contactors coupled to said at least one DC supply circuit and configured to be coupled to said plurality of DC connection circuits to place said at least one power conversion module of said plurality of power conversion modules into service.

15. The system in accordance with claim 10 further comprising at least one cable coupled to said at least one switchyard module and said at least one power conversion module of said plurality of power conversion modules, said at least one cable having a length that facilitates raising said at least one power conversion module of said plurality of power conversion modules from said at least one receptacle to a surface-floating recovery platform without disconnecting said at least one cable from said at least one switchyard module and said at least one power conversion module of said plurality of power conversion modules.

16. The system in accordance with claim 15 further comprising at least one dry-mateable connector coupled to said at least one switchyard module and said at least one power conversion module of said plurality of power conversion modules.

17. The system in accordance with claim 10 further comprising at least one electric power distribution device coupled to said plurality of power conversion modules through a plurality of wet-mateable connectors.

18. The system in accordance with claim 10, wherein said plurality of power conversion modules are electrically coupled together in parallel and each power conversion module of said plurality of power conversion modules is electrically isolable from the other said power conversion modules.

19. A method of operating a submersible power distribution system that includes at least one receptacle configured to be exposed to an underwater environment and configured to be located under water, the at least one receptacle including a plurality of power conversion modules removably positioned therein, the submersible power distribution system also includes at least one switchyard module electrically coupled to the plurality of power conversion modules through at least one HVDC connection cable, the at least one switchyard module including a plurality of switches configured to electrically connect, bypass, and isolate each power conversion module of the plurality of power conversion modules, said method comprising:
positioning a floating recovery platform proximately over the at least one receptacle, the floating recovery platform including at least one lifting apparatus;
operating the plurality of switches to at least partially electrically bypass and isolate at least one power conversion module of the plurality of power conversion modules;
electrically disconnecting the at least one power conversion module of the plurality of power conversion modules from downstream loads by uncoupling at least one wet-mateable connector from the at the least one power conversion module of the plurality of power conversion modules;
coupling the lifting apparatus to the at least one power conversion module of the plurality of power conversion modules; and
raising the at the least one power conversion module of the plurality of power conversion modules from the receptacle to the floating recovery platform while maintaining the at the least one power conversion module of the plurality of power conversion modules physically coupled to the at least one switchyard module through the at least one HVDC connection cable.

20. The method in accordance with claim 19 further comprising:
lowering the at the least one power conversion module of the plurality of power conversion modules from the floating recovery platform to the receptacle while maintaining the at the least one power conversion module of the plurality of power conversion modules coupled to the at least one the switchyard module through the at least one HVDC connection cable;
uncoupling the lifting apparatus from the at the least one power conversion module of the plurality of power conversion modules;
electrically connecting the at the least one power conversion module of the plurality of power conversion modules to the downstream loads by coupling the at least one wet-mateable connector with the at the least one power conversion module of the plurality of power conversion modules; and
operating the plurality of switches to at least partially electrically reconnect the at the least one power conversion module of the plurality of power conversion modules.

* * * * *